(12) United States Patent
Oetlinger et al.

(10) Patent No.: US 7,185,797 B2
(45) Date of Patent: Mar. 6, 2007

(54) RAIL ASSEMBLY FOR BLANKING TOOL INSERT

(75) Inventors: Frank E. Oetlinger, Grafton, WI (US); Peter H. Thermausen, Milwaukee, WI (US); Russell Kempka, Jr., Milwaukee, WI (US)

(73) Assignee: Blanking Systems, Inc., Grafton, WI (US)

( * ) Notice: Subject to any disclaimer, the term of this patent is extended or adjusted under 35 U.S.C. 154(b) by 0 days.

(21) Appl. No.: 10/731,627

(22) Filed: Dec. 9, 2003

(65) Prior Publication Data

US 2004/0167002 A1  Aug. 26, 2004

(51) Int. Cl.
*B65H 35/10* (2006.01)
(52) U.S. Cl. .......................... 225/104; 225/90; 225/97
(58) Field of Classification Search ............... 403/387, 403/233, 234; 225/104, 90, 97
See application file for complete search history.

(56) References Cited

U.S. PATENT DOCUMENTS 2,354,976 A * 8/1944 Robinson ................. 403/387
2,486,723 A * 11/1949 Thompson ................ 403/279
2,637,249 A * 5/1953 Swenson .................. 269/134
6,019,358 A * 2/2000 Bernstein .................. 269/137
6,851,243 B1* 2/2005 Sandford .................... 52/645
2005/0188805 A1* 9/2005 McArdle et al. ........... 83/468.7

* cited by examiner

*Primary Examiner*—Kenneth E. Peterson
*Assistant Examiner*—Isaac Hamilton
(74) *Attorney, Agent, or Firm*—Boyle Fredrickson Newholm Stein & Gratz S.C.

(57) ABSTRACT

A rail assembly is provided for supporting a blanking tool insert on an outer frame for a lower blanking tool of a die cutting machine. The rail assembly includes an elongated insert receiving structure for receiving a portion of the blanking tool insert. A plate member is interconnected to the outer frame and a clamping structure is operatively connected to the plate member. The clamping structure is movable between a clamping position for rigidly retaining a portion of the insert receiving structure against the plate member and a release position.

20 Claims, 3 Drawing Sheets

RAIL ASSEMBLY FOR BLANKING TOOL INSERT

FIELD OF THE INVENTION

This invention relates generally to die cutting machines for making carton blanks, and in particular, to a rail assembly for supporting a blanking tool insert on the frame assembly for a lower blanking tool.

BACKGROUND AND SUMMARY THE INVENTION

In the manufacture of cartons, small sheets of paper material having specific profiles are cut out of larger sheets of paper material. These smaller sheets are known as carton blanks that, in turn, are formed into cartons and/or boxes. The carton blanks are formed during a process known as a blanking operation in a die cutting machine.

In a die cutting machine, the carton blanks are cut, but not removed from a large sheet of paper material. After the blanks have been cut, the sheet is moved downstream in the die cutting machine to a blanking station where the sheet is positioned over a blanking tool insert support on a frame assembly. The frame assembly includes an outer frame and an inner grid having large openings that correspond generally to the size, shape and position to the profile of the carton blank previously cut. The blanking tool insert is provided on the inner grid to further support the carton blanks, and includes openings that correspond in size, in shape and in position to the profile of the carton blank as previously cut. Below the frame is a mechanism for stacking the carton blanks.

At the blanking station, an upper tool is used in combination with the lower tool or frame assembly to knock the carton blanks from the sheet of paper material while holding the scrap material that surrounds the blanks. The upper tool has a support board that moves vertically up and down in the die cutting machine, and the support board typically has a plurality of stand-offs depending therefrom that hold pushers spaced beneath the board which in turn are used to push the carton blanks from the sheet through the lower tool or frame assembly. A plurality of presser assemblies are also mounted in the support board and depend therefrom to hold the scrap material against the lower tool or frame assembly during the blanking operation so that the blanks may be pushed from the sheet. A presser assembly typically includes a presser rail that is biased downwardly away from the support board by a spring so that the rail is positioned slightly below the pushers. As the upper tool is lowered, the presser rail engages the sheet of paper material first such that a scrap portion of the large sheet of material is secured between the presser rail and the frame. The upper tool then continues to be lowered such that the sheet of material engages the blanking tool insert supported on the inner grid within the frame while at substantially the same time the pushers engage the carton blanks and knock the carton blanks out of the sheet of material and through the openings in the blanking tool insert and the inner grid. The carton blanks then fall into a stacking mechanism below the frame where the blanks are stacked for further processing.

The lower tool used in the blanking operation is typically comprised of a steel outer frame that supports an inner grid. The inner grid is typically comprised of a plurality of lengthwise and crosswise extending bars. In order to secure the inner grid in place on the outer frame, the ends of each bar are typically screwed onto attachment pieces that, in turn, are mounted on the lengthwise and crosswise rails of the outer frame. The blanking tool insert is positioned on the inner grid and defines a pattern that conforms to the die cut in the sheet of paper material. It can be appreciated the inner grid must be reconfigured and the blanking tool insert must be replaced whenever a different carton blank needs to be produced. Thus, the disassembly of the inner grid and the blanking tool insert from the outer frame may become a very cumbersome and time-consuming activity. Thus, it is desirable to provide a device that allows a user to quickly attach and/or remove the blanking tool insert from the outer frame.

Therefore, it is a primary object and feature of the present invention to provide an improved rail assembly for supporting a blanking tool insert on a frame assembly for a lower blanking tool of a carton die cutting machine.

It is a further object and feature of the present invention to provide a rail assembly for supporting a blanking tool insert on a frame assembly for a lower blanking tool that allows a user to easily attach and/or remove the blanking tool insert from the frame assembly.

It is a still further object and feature of the present invention to provide a rail assembly for supporting a blanking tool insert on a frame assembly for a lower blanking tool which is compatible with standard blanking operation machinery and which is relatively inexpensive.

In accordance with the present invention, a rail assembly is provided for supporting a blanking tool insert on an outer frame for a lower blanking tool of a carton die cutting machine. The rail assembly includes an elongated, insert receiving element that defines a cavity for receiving a portion of the blanking tool insert therein. A clamp piece is connectable to the frame and defines a vertically extending inner face, an opposite vertically extending outer face, and a bore extending between the inner face and the outer face. A jaw element is operatively connected to a clamp piece so as to define a clamping cavity therebetween. The jaw element is movable between a clamping position for retaining a portion of the insert receiving element in the clamping cavity and a release position.

The jaw element may also include a first clamping surface that is engageable with the insert receiving element when the jaw element is in the clamping position. The jaw element may also include a second clamping surface engageable with the clamp piece when the jaw element is in the clamping position. The first and second clamping surfaces of the jaw element are generally arcuate and include an apex. It is contemplated that a screw member move the jaw member between the clamping and release positions. The bore through the clamp piece extends along the axis at an acute angle to the outer face. The acute angle of the bore is in the range of 30° to 80°, and preferably, approximately 65°. Also, the outer face of the clamp piece may include a lip. The lip is engageable with a corresponding ledge along the outer face to support the clamp piece thereon. A fastening element extends through the bore in the clamp piece and is receivable in the corresponding slot in the outer frame to interconnect the clamp piece to the outer frame. The inner face of the clamp piece defines a recessed slot therein. A jogger may be slidably disposed in the recessed slot in the inner face of the clamp piece. It is contemplated to drive a pin through the blanking tool insert and into a pin receiving depression in an upper surface of the clamp piece to interconnect the blanking tool insert to the rail assembly.

In accordance with a further aspect of the present invention, a rail assembly is provided for supporting a blanking tool insert on an outer face for a lower blanking tool of a carton die cutting machine. The rail assembly includes an elongated insert retaining structure for receiving a portion of the blanking tool insert. A plate member defines inner and outer faces and a bore that extends between the inner face and the outer face along an axis at an acute angle to the outer face. A clamping structure is operatively connected to the plate member. The clamping structure is movable between a clamping position for rigidly retaining a portion of the insert receiving structure against the plate member and a release position.

The inner face of the plate member defines a recess slot therein for a jogger. The clamping structure includes a jaw element having a first clamping surface engageable with the insert receiving structure with the clamping structure in the clamping position. The clamping structure also includes a second clamping surface engageable with the plate member with the clamping structure in the clamping position. The first and second clamping surfaces of the jaw element are generally arcuate and include apexes. A screw member is provided for moving the clamping structure between the clamping and the release positions.

The bore in the plate member extends along an angle in the range of 30° and 80°, and most preferably, at an angle of approximately 65°. It is contemplated that the outer face of the plate member include a lip. The lip is engageable with a corresponding ledge along the outer face to support the plate member thereon.

In accordance with a still further aspect of the present invention, a frame assembly is provided for a lower blanking tool of a carton die cutting machine. The frame assembly includes a rigid outer frame having a slot therein. A blanking tool insert receivable on the outer frame and a rail assembly is also provided for interconnecting the blanking tool insert to the outer frame. The rail assembly includes an elongated support that receives a portion of the blanking tool insert and a plate member. The plate member defines inner and outer faces and a bore extending between the inner face and the outer face along an axis at an acute angle to the outer face. The rail assembly further includes a clamping structure operatively connected to the plate member. The clamping structure is movable between a clamping position for rigidly retaining a portion of the elongated support against the plate member and a release position. A fastening element extends through the bore in the plate member and is receivable in the slot in the outer frame to interconnect the plate member to the outer frame.

The acute angle of the bore through the plate member is preferably in the range of 30° to 80°, and most preferably, approximately 65°. The inner face of the plate member defines a recessed slot therein for receiving a jogger. The clamping structure includes a jaw element having a first clamping surface engageable with the elongated support when the clamping structure is in the clamping position and a second clamping surface engageable with the plate member when the clamping structure is in the clamping position. The first and second clamping surfaces of the jaw element are generally arcuate and include apexes. It is contemplated for the plate member includes an upper surface that interconnects the inner and outer faces. The upper surface of the plate member includes a pin receiving depression therein for receiving a pin that extends through the blanking tool insert.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 4 is a cross sectional view of the rail assembly of the present invention taken along line 4—4 of FIG. 3.

DETAILED DESCRIPTION OF THE PREFERRED EMBODIMENT

Figure 1:
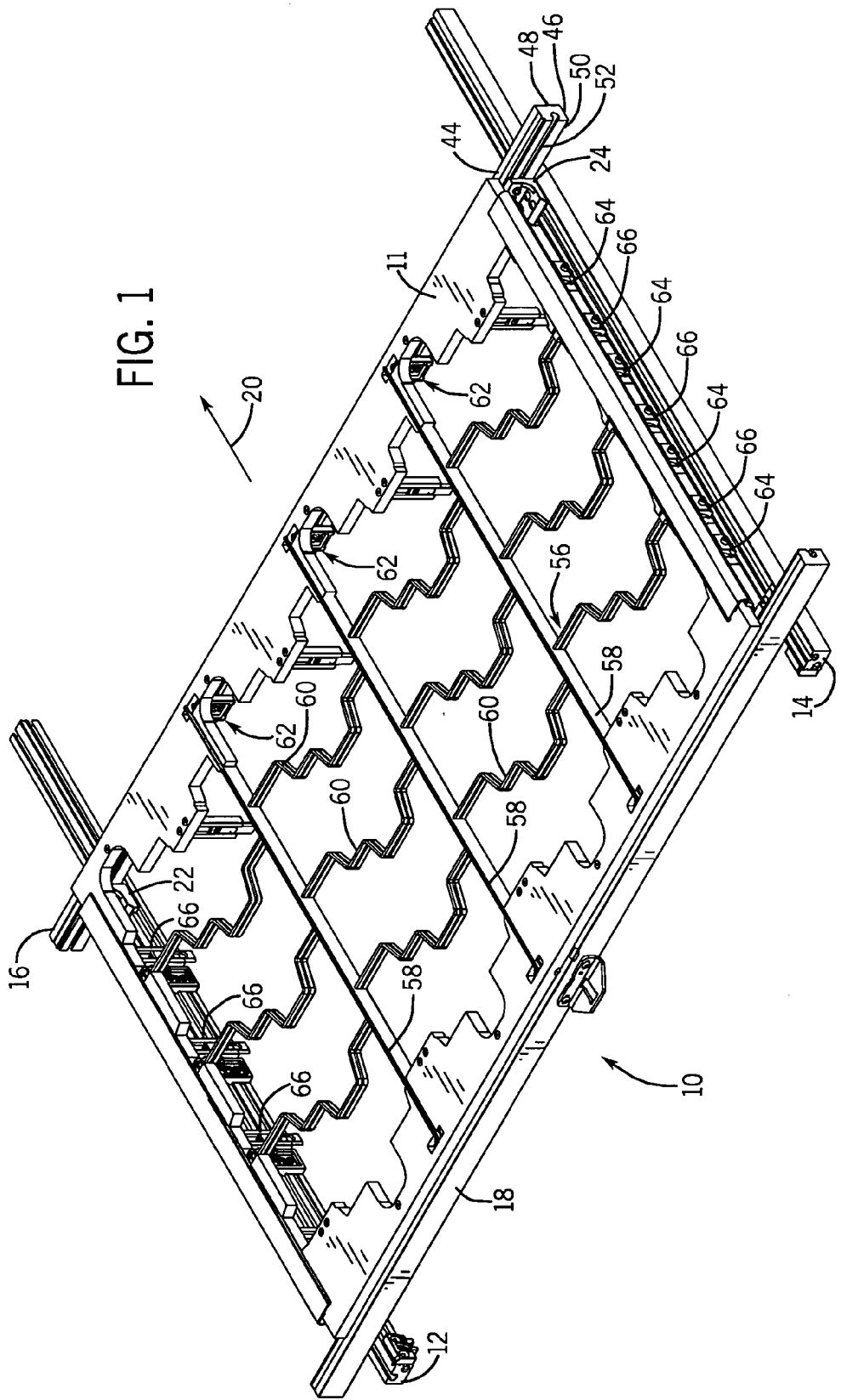
FIG. 1 is an isometric view of a frame assembly having a blanking tool insert supported thereon utilizing a plurality of rail assemblies in accordance with the present invention.
Figure 2:
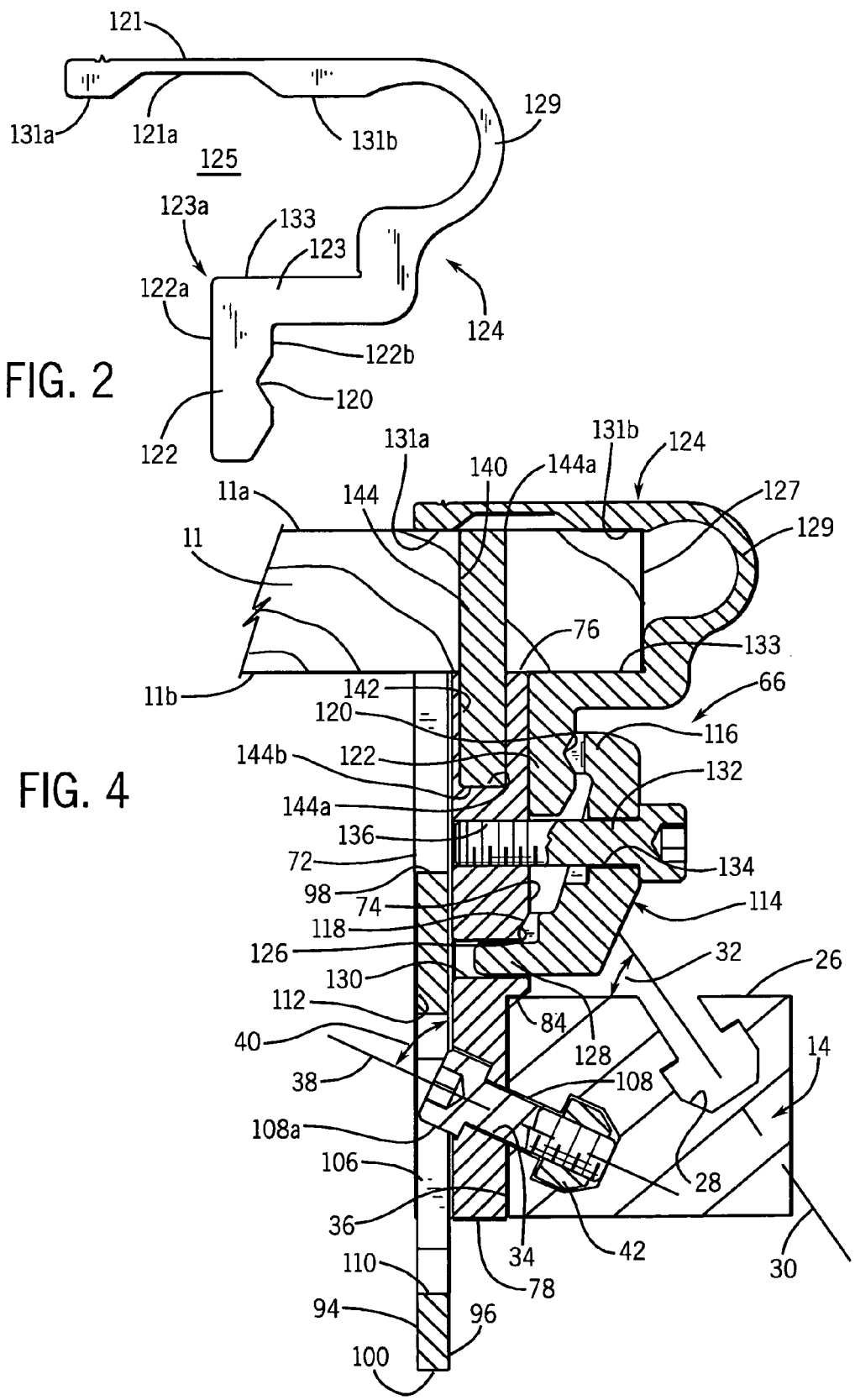
FIG. 2 is a side elevational view of a insert-retaining element for a rail assembly in accordance with the present invention.

Referring to FIG. 1, a lower frame assembly for a blanking tool of a carton die cutting machine is generally designated by the numeral 10. As is known, a die cutting machine converts or processes a sheet of paper material into a carton blank. These machines are well known in the art and are used to cut one or several blanks into each sheet of paper material which, after folding and gluing, may be formed into cartons or boxes. As is conventional, the sheets of paper material move in a substantially horizontal plane within the machine and are carried through various sequences of printing, cutting, embossing, creasing, waste stripping and/or blanking stations.

The die cutting machine usually is formed by a series of stations with the first station being a starting position or input station in which the sheets, which may be preprinted if desired, are taken one by one from the top of a stack to a feed table where they are placed in position against frontal and side guides. The sheet can then be grasped by a gripper bar and lead downstream or in the machine direction into subsequent processing stations. Typically, the sheet is first conveyed into a cutting station where the carton or box blanks of a desired size and profile are die cut into the sheet. These blanks are held to the sheet by knicks which are arranged along the cut edges of the blanks. This cutting station is usually comprised of upper and lower tools, one of which is provided with a plurality of line-shaped straight and curved die cutting blades. If desired, the cutting station may be proceeded by a printing station, or as noted above, the sheets may be preprinted. After cutting, the sheet is then lead to a stripping station where the waste, i.e., the unused scrap between the various blanks, is grasped by upper and lower pins in order to be lead downward into a waste container. The sheet is then fed to a blanking station where the sheet is positioned horizontally over a lower frame for support. The lower frame includes an inner grid and blanking tool insert 11 positioned thereon having large openings 11a that correspond in size, in shape and in position to the profile of the blank previously cut. An upper blanking tool having one or more presser assemblies mounted thereto then moves vertically downwardly in the die cutting machine to secure the scrap portions against blanking tool insert 11 and then, as the tool continues to move downwardly, the fasten points or knicks between the blanks and the sheet are broken by pushers so that each of the blanks are released, pushed through corresponding openings 11a in blanking tool insert 11 and falls below the frame where the blanks are stacked for further processing. Finally, the residual or remaining portion of the sheet is carried to a delivery or exit station where it is released by the gripper bar as waste material.

Referring back to FIG. 1, lower frame assembly 10 includes an outer frame comprised of a pair of opposite, spaced apart longitudinally extending side frame members or side rails 12 and 14, and a pair of opposite, spaced apart cross frame members or cross rails 16 and 18 extending crosswise between side rails. 12 and 14. Arrow 20 illustrates the machine direction, i.e. the direction of movement of a sheet of paper material (not shown) within the die cutting machine. Thus, as illustrated in FIG. 1, side rail 12 may be considered the left side rail while side rail 14 may be considered the right side rail. Likewise, cross rail 16 may be considered the front or leading cross rail, while cross rail 18 may be considered the rear or trailing cross rail. As illustrated, cross rails 16 and 18 are of sufficient length such that the opposite ends of cross rails 16 and 18 overlap corresponding opposite ends of side rails 12 and 14. In addition, it is contemplated that cross rails 16 and 18 be disposed on top of side rails 12 and 14 so that the lower surface of cross rails 16 and 18 abut against the upper surfaces of side rails 12 and 14.

Figure 3:
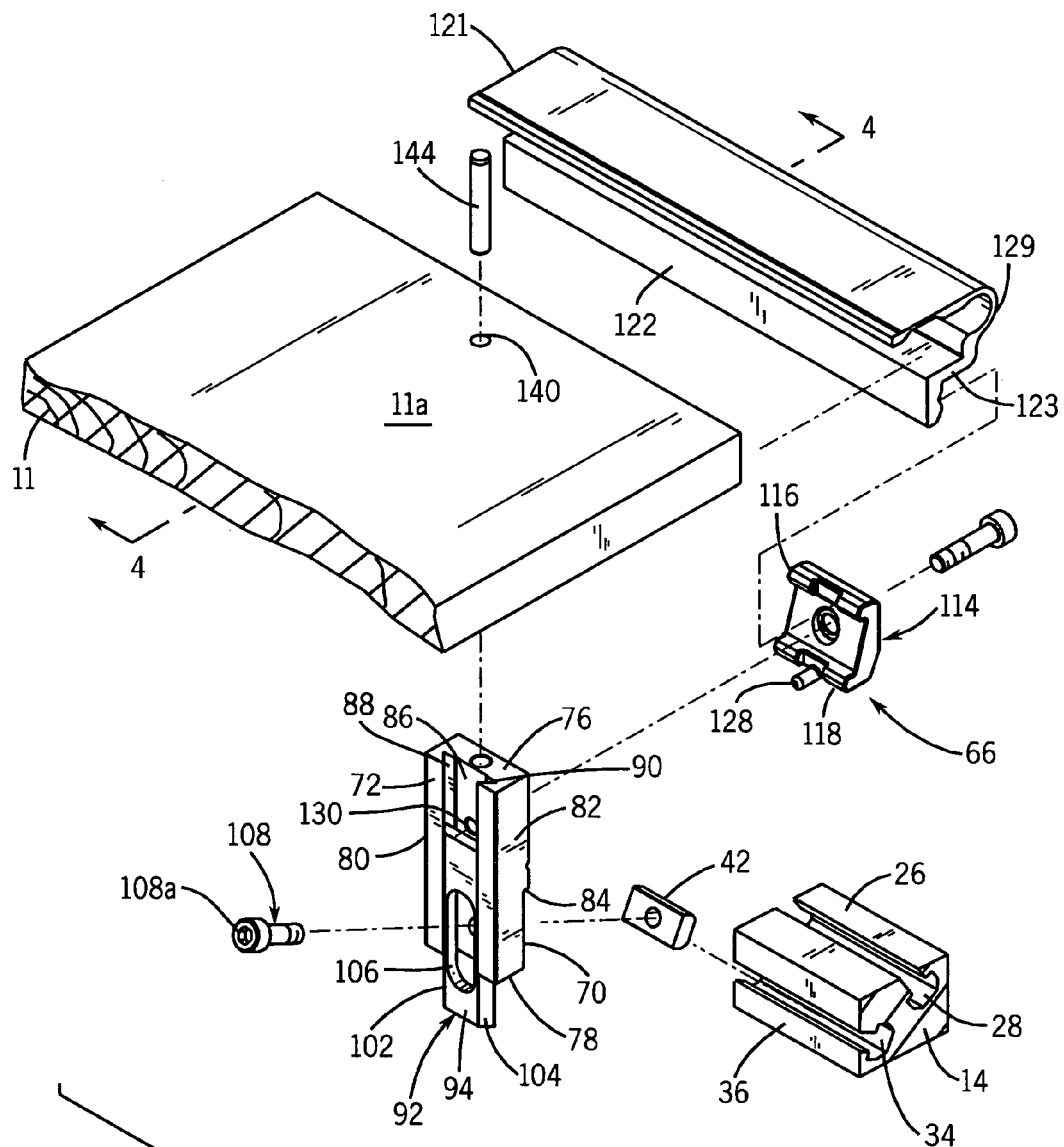
FIG. 3 is an exploded, isometric view of a rail assembly in accordance with the present invention.

As best seen in FIGS. 1 and 3, side rail 12 is rigidly interconnected to cross rails 16 and 18 by a pair of corner pieces 22 and 24, respectively. Similarly, side rail 14 is rigidly interconnected to cross rails 16 and 18 by corner pieces 24 and 22, respectively. Corner pieces 22 are hereinafter referred to as right corner pieces while corner pieces 24 are hereinafter referred to as left corner pieces. The terms "right" and "left" refer to the location of a tenon on the underside of each corner piece. It can be appreciated that left corner pieces 24 are essentially mirror images of right corner pieces 22. Corner pieces 22 and 24 are used to rigidly interconnect rails 12, 14, 16 and 18 to one another so as to retain rails 12, 14, 16 and 18 together in a "square" or 90° relationship.

Side rails 12 and 14 are identical in structure, and as such, the description hereinafter of side rail 12 is understood to describe side rail 14 as if fully described herein. In addition, side rails 16 and 18 are identical in structure, and as such, the description hereinafter of side rail 16 is understood to describe side rail 18 as if fully described herein. Referring to FIGS. 1 and 3–4, side rail 12 extends along a longitudinal axis and includes upper surface 26 lying in a plane. Upper surface 26 of side rail 12 includes t-shaped slot 28 therein that extends along the entire length thereof. As best seen in FIG. 4, slot 28 extends along axis 30 disposed at acute angle 32 to upper surface 26 of side rail 12. It is contemplated that acute angle 32 fall within the range of 1° and 89°, but is preferably between about 30° to about 80° and is most preferably about 65°. Slot 28 has a terminal end located within side rail 12 and has an open end that opens to upper surface 26 of side rail 12.

Side rail 12 further includes second t-shaped slot 34 formed along the entire length of inner surface 36 of side rail 12. Inner surface 36 of side rail 12 lies in plane that is generally perpendicular to upper surface 26 of side rail 12. Slot 34 extends along axis 38 disposed at acute angle 40 with respect to inner surface 36. Angle 40 may be any angle between about 1° to about 89°, but is preferably between about 30° to about 80° and is most preferably about 65°. Slot 34 is identical in structure to slot 28 and extends along the entire length of side rail 12. As illustrated, slot 34 has a terminal end located within side rail 12 and an open end which opens to inner surface 36 of side rail 12. The terminal end of slot 34 (as well as the terminal end of slot 28) is configured to conform to the shape of nuts 42 captured therein, for reasons hereinafter described.

Referring back to FIG. 1, cross rail 16 includes upper surface 44, opposite lower surface 46, outer surface 48, and opposite inner surface 50. Inner surface 50 is generally planer and faces the interior of frame assembly 10. Cross rail 16 includes a t-shaped slot 52 formed therein. Slot 52 extends along the entire length of inner surface 50 of cross rail 16 and opens to both of the opposite ends of cross rail 16. Slot 52 has a terminal end located within the interior of cross rail 16 and has an open end that opens to inner surface 50 of side rail 16. The terminal end of slot 52 is configured to conform to the shape of nuts 42 to be captured therein, for reasons hereinafter described. Slot 52 defines a downwardly extending axis disposed at the acute angle with respect to inner surface 50 of cross rail 16. It is contemplated that angle fall in the range of 1° and 89°, but is preferably an angle of about 30° to about 80°, and is most preferably about 65°.

Lower frame assembly 10 further includes inner grid 56 comprised by a plurality of parallel lengthwise bars 58 extending in machine direction 20 between front cross rail 16 and real cross rail 18, and a plurality of substantially parallel crosswise bars 60 extending transverse to machine direction 20 between left side rail 12 and right side rail 14. Bars 58 and 60 of inner grid 56 can be point welded or glued with adhesive at the points where they intersect to insure the rigidity of inner grid 56. The opposite ends of bars 58 are attached to cross rails 16 and 18 by corresponding clamp devices 62. Likewise, the opposite ends of bars 60 are attached to side rails 12 and 14 by corresponding clamp devices 64.

As best seen in FIGS. 1 and 3–4, blanking tool insert 11 is interconnected to side rails 12 and 14 by a plurality of rail assemblies 66. Each rail assembly 66 includes an upright plate member 70 that defines substantially flat, vertically extending inner face 72, substantially flat oppositely vertically extending outer face 74, horizontally extending upper face 76, and a pair of opposite end faces 80 and 82. Bore 142 is provided in upper face 72 of each plate member 40, for reasons hereinafter described. As described, each plate member 70 is generally rectangular in shape, although outer geometrically shapes are contemplated.

Lip 84 is formed along outer face 74 of each plate member 70. Each lip 84 projects at right angle to outer face 74 and extends completely across outer face 74 between end faces 80 and 82 of each plate member 70. Lip 84 does not necessarily extend completely across outer face 74 of each plate member 70, but preferably does so to provide the maximum amount of clamping force against inner surface 36 of side rails 12 and 14.

Inner face 72 of each plate member 70 includes recessed surface 86 that defines a slot that extends along the entire height of plate member 70 and opens to both upper face 76 and lower face 78. The slot in each plate member 70 is further defined by first and second side walls 88 and 90, respectively, that extend from inner face 72 to recessed surface 86. Side walls 88 and 90 diverge from each other, for reasons hereinafter described.

Jogging elements 92 are slidably received within the slots in plate members 70. Each jogging element 92 is defined by substantially flat, vertically extending inner face 94, substantially flat vertically extending outer face 96, horizontally extending upper face 98, horizontally extending lower face 100, and opposite end faces 102 and 104. End faces 102 and 104 diverge from each other as end faces 102 and 104 extend from inner face 94 to outer face 96 of jogging element 92. As described, end face 102 of jogging element 92 forms a slidable inner face with side wall 88 of plate member 70, end face 104 of jogging element 92 forms a slidable inner face with side wall 90 of plate member 70, and outer face 96 of jogging element 92 forms a slidable inner face with recessed surface 86 of plate member 70.

Jogging element 92 further includes wall 106 that defines a generally oblong opening to accommodate a portion of head 108a of bolt 108. Each bolt 108 is threaded into a corresponding nut 42 in slot 34 to interconnect a corresponding plate member 70 to side rail 14. With jogging element 92 positioned within the slot in plate member 70, jogging element 92 is slidable between a first raised position wherein lower face 100 of jogging element 92 is substantially flush with lower face 78 of plate member 70 and wherein head 108a of bolt 108 engages lower portion 110 of wall 106 and a lowered portion wherein lower face 100 of jogging element 92 is below lower face 78 of plate member 70 and bolt head 108a of bolt 108 engages upper portion 112 of wall 106 of jogging element 92.

Each rail assembly 66 further includes c-shaped jaw 114 having a pair of generally parallel legs 116 and 118, with leg 118 being slightly longer than leg 116. The terminal end of leg 116 is rounded for engagement with corresponding v-shaped groove 120 formed in vertical leg 122 of insert retaining element 124. The terminal end of leg 118 is also rounded for engagement with corresponding v-shaped groove 126 in outer face 74 of each plate member 70. Pin 128 projects horizontally from lower leg 118 of each c-shaped jaw 114 into aperture 130 which extends between outer face 74 and recessed surface 86 of a corresponding plate member 70.

Insert retaining element 124 includes a pair of generally parallel legs 121 and 123 which define cavity 125 for receiving one of the edges 127 of blanking tool insert 11 therein. Legs 121 and 123 are interconnected by a generally c-shaped spring portion 129 that resiliently maintains legs 121 and 123 in position. Vertical leg 122 of insert retaining element 124 depends from terminal end 123a of leg 123. Vertical leg 122 includes a generally flat inner face 122a engageable with outer faces 74 of corresponding plate members 70 of rail assemblies 66 and outer face 122b having generally v-shaped groove 120 extending along the length thereof. Inner surface 121a of leg 121 of insert retaining element 124 includes first and second horizontally spaced insert engaging surfaces 131a and 131b directed towards inner surface 133 of leg 123 of insert retaining element 124.

Insert retaining element 124 is interconnected to corresponding side rails 12 and 14 by a plurality of rail assemblies 66. It can be appreciated that the mounting of insert receiving element 124 to side rail 14 may be understood to describe the mounting of insert retaining element 124 to side rail 12 as if fully described herein. More specifically, leg 122 of insert receiving element 124 is inserted between outer faces 74 of plate members 70 and the terminal ends of legs 116 of c-shaped jaws 114 of corresponding rail assemblies 66 interconnected to side rail 14, as heretofore described. Bolts 132 extend through apertures 134 of corresponding c-shaped jaws 114 into bores 136 in plate members 70. As bolts 132 are turned down in a clockwise direction, c-shaped jaws 114 are moved toward corresponding outer faces 74 of plate members 70 so that the terminal ends of legs 116 engage v-shaped groove 120 in vertical leg 122 of insert retaining element 124 and so that legs 118 engage corresponding v-shaped grooves 126 in outer faces 74 of plate members 70 until insert retaining element 124 is rigidly retained in position.

After the plurality of rail assemblies 66 are interconnected to side rails 12 and 14, as heretofore described, blanking tool insert is positioned on upper faces 76 of plate members 70 of the plurality of rail assemblies 66 such that apertures 140 extending through blanking tool insert 11 are aligned with corresponding bores 142 in upper faces 76 of plate members 70 of the plurality of rail assemblies 66. Pins 144 are driven through apertures 140 in blanking tool insert 11 and into corresponding bores 142 in corresponding plate members 70 of the plurality of rail assemblies 66 such that upper ends 144a of pins 144 are substantially flush with upper surface 11a of blanking tool insert 11 and such that the lower ends 144b of pins 144 engage the closed ends 142a of bores 142 in plate members 70 of the plurality of rail assemblies 66.

In addition, insert retaining elements 124 are positioned over corresponding edges 127 of blanking tool insert 11 such that insert engaging faces 131a and 131b of legs 121 of insert receiving elements 124 engage upper surface 11a of blanking tool insert 11 and such that inner surfaces 133 of legs 123 of insert receiving elements 124 receive lower surface 11b of blanking tool insert 11 thereon. Resilient walls 129 of insert retaining elements 124 allow for edges 127 of blanking tool insert 11 to be snuggly received within cavities 125 in insert retaining elements 124. As described, blanking tool insert 11 is retained on lower frame assembly 10 in anticipation of a blanking operation.

Various modes of carrying out the invention are contemplated as being within the scope of the following claims particularly pointing and distinctly claiming the subject matter that is regarded as the invention.

We claim:

1. A rail assembly supporting a blanking tool insert on an outer frame for a lower blanking tool of a carton die cutting machine, comprising:

an elongated insert receiving element including an upper wall and a lower wall that define a cavity therebetween receiving a portion of the blanking tool insert therein, the elongated insert receiving element further including a mounting leg depending from the lower wall;

a clamp piece connectable to the outer frame and defining a vertically extending inner face, an opposite vertically extending outer face engageable with the outer frame, and a bore extending between the inner face and the outer face; and a jaw element operatively connected to the clamp piece so as to define a clamping cavity between the jaw element and the outer face of the clamp piece, the jaw element being movable between a clamping position for retaining the leg of the insert receiving element in the clamping cavity and a release position.

2. The rail assembly of claim 1 wherein the jaw element includes a first clamping surface engageable with the insert receiving element when the jaw element is in the clamping position.

3. The rail assembly of claim 2 wherein the jaw element includes a second clamping surface engageable with the clamp piece when the jaw element is the clamping position.

4. The rail assembly of claim 3 wherein the second clamping surface of the jaw element is generally arcuate and includes an apex.

5. The rail assembly of claim 2 wherein the first clamping surface of the jaw element is generally arcuate and includes an apex.

6. The rail assembly of claim 1 further comprising a screw member for moving the jaw element between the clamping and release positions.

7. The rail assembly of claim 1 wherein the bore through the clamp piece extends along an axis at an acute angle to the outer face.

8. The rail assembly of claim 7 wherein the acute angle is in the range of 30° and 80°.

9. The rail assembly of claim 7 wherein the acute angle is approximately 65°.

10. The rail assembly of claim 1 further comprising a fastening element extending through the bore through the clamp piece and receivable in a corresponding slot in the outer frame to interconnect the clamp piece to the outer frame.

11. A rail assembly supporting a blanking tool insert on an outer frame for a lower blanking tool of a carton die cutting machine, comprising:
    an elongated insert receiving structure element including an upper wall and a lower wall that define a cavity therebetween receiving a portion of the blanking tool insert, the elongated insert receiving element further including a mounting leg depending from the lower wall;
    a plate member defining inner and outer faces and including a bore extending between the inner face and the outer face along an axis at an acute angle to the outer face and wherein the acute angle is in the range of 30° and 80°; and
    a clamping structure operatively connected to the plate member and being movable between a clamping position for rigidly retaining the mounting leg of the insert receiving structure against the plate member and a release position.

12. The rail assembly of claim 11 wherein clamping structure includes a jaw element having:
    a first clamping surface engageable with the insert receiving structure with the clamping structure in the clamping position; and
    a second clamping surface engageable with the plate member with the clamping structure in the clamping position.

13. The rail assembly of claim 12 wherein the first and second clamping surfaces of the jaw element are generally arcuate and include apexes.

14. The rail assembly of claim 11 further comprising a screw member for moving the clamping structure between the clamping and release positions.

15. The rail assembly of claim 11 wherein the acute angle is approximately 65°.

16. A rail assembly supporting a blanking tool insert on an outer frame for a lower blanking tool of a carton die cutting machine, comprising:
    an elongated insert receiving element including an upper wall and a lower wall that define a cavity therebetween receiving a portion of the blanking tool insert therein, the elongated insert receiving element further including a mounting leg depending from the lower wall;
    a clamp piece connectable to the outer frame and defining a vertically extending inner face, an opposite vertically extending outer face, and a bore extending between the inner face and the outer face, the outer face of the clamp piece including a lip engageable with a corresponding ledge along the outer frame to support the clamp piece thereon; and
    a jaw element operatively connected to the clamp piece so as to define a clamping cavity therebetween, the jaw element being movable between a clamping position for retaining the mounting leg of the insert receiving element in the clamping cavity and a release position.

17. A rail assembly supporting a blanking tool insert on an outer frame for a lower blanking tool of a carton die cutting machine, comprising:
    an elongated insert receiving element including an upper wall and a lower wall that define a cavity therebetween receiving a portion of the blanking tool insert therein, the elongated insert receiving element further including a mounting leg depending from the lower wall;
    a clamp piece connectable to the outer frame and defining a vertically extending inner face, an opposite vertically extending outer face, and a bore extending between the inner face and the outer face, the inner face of the clamp piece defining a recessed slot therein;
    a jaw element operatively connected to the clamp piece so as to define a clamping cavity therebetween, the jaw element being movable between a clamping position for retaining the mounting leg of the insert receiving element in the clamping cavity and a release position; and
    a jogger slidably disposed in the recessed slot in the inner face of the clamp piece.

18. A rail assembly supporting a blanking tool insert on an outer frame for a lower blanking tool of a carton die cutting machine, comprising:
    an elongated insert receiving structure element including an upper wall and a lower wall that define a cavity therebetween receiving a portion of a blanking tool insert, the elongated insert receiving element further including a mounting leg depending from the lower wall;
    a clamp piece connectable to the outer frame and defining a vertically extending inner face, an opposite vertically extending outer face, and a bore extending between the inner face and the outer face, the inner face of the clamp piece defining a recessed slot therein;
    a jaw element operatively connected to the clamp piece so as to define a clamping cavity therebetween, the jaw element being movable between a clamping position for retaining the mounting leg of the insert receiving element in the clamping cavity and a release position; and
    wherein the clamp piece includes an upper surface interconnecting the inner and outer faces, the upper surface of the clamp piece including a pin-receiving depression therein for receiving a pin extending through the blanking tool insert.

19. A rail assembly supporting a blanking tool insert on an outer frame for a lower blanking tool of a carton die cutting machine, comprising:
    an elongated insert receiving element including an upper wall and a lower wall that define a cavity therebetween receiving a portion of the blanking tool insert therein, the elongated insert receiving element further including a mounting leg depending from the lower wall;
    a plate member defining inner and outer faces, the inner face of the plate member defining a recessed slot therein;
    a clamping structure operatively connected to the plate member and being movable between a clamping position for rigidly retaining the mounting leg of the insert receiving structure against the plate member and a release position; and
    a jogger slidably disposed in the recessed slot in the inner face of the plate member.

20. A rail assembly supporting a blanking tool insert on an outer frame for a lower blanking tool of a carton die cutting machine, comprising:
    an elongated insert receiving element including an upper wall and a lower wall that define a cavity therebetween for receiving a portion of the blanking tool insert therein, the elongated insert receiving element further including a mounting leg depending from the lower wall;

a plate member defining inner and outer faces, the outer face of the plate member including a lip engageable with a corresponding ledge along the outer face to support the plate member thereon; and a clamping structure operatively connected to the plate member and being movable between a clamping position for rigidly retaining the mounting leg of the insert receiving structure against the plate member and a release position.

* * * * *